(12) United States Patent
Chen

(10) Patent No.: US 9,942,717 B1
(45) Date of Patent: Apr. 10, 2018

(54) METHOD AND APPARATUS FOR DIRECTION-AWARE DEVICE LOCATION

(71) Applicant: Rapid Focus Security, LLC, Burlington, VT (US)

(72) Inventor: Rong Chen, Boston, MA (US)

(73) Assignee: Rapid Focus Security, LLC, Burlington, VT (US)

( * ) Notice: Subject to any disclaimer, the term of this patent is extended or adjusted under 35 U.S.C. 154(b) by 0 days.

(21) Appl. No.: 15/617,103

(22) Filed: Jun. 8, 2017

(51) Int. Cl.
*H04W 74/00* (2009.01)
*H04W 4/02* (2018.01)
*H04B 17/318* (2015.01)
*H04W 40/24* (2009.01)
*H04W 16/22* (2009.01)
(Continued)

(52) U.S. Cl.
CPC ........... *H04W 4/027* (2013.01); *G01S 5/0252* (2013.01); *G01S 19/13* (2013.01); *H04B 17/318* (2015.01); *H04W 4/021* (2013.01); *H04W 4/026* (2013.01); *H04W 16/22* (2013.01);
(Continued)

(58) Field of Classification Search
CPC ..... H04W 12/08; H04W 36/08; H04W 36/32; H04W 36/36; H04W 48/16; H04W 48/18; H04W 48/20; H04W 72/085; H04W 88/06; H04W 12/06; H04W 36/14; H04W 36/24; H04W 52/42; H04W 84/005; H04W 84/12; H04W 88/02; H04W 64/00; H04W 4/04; H04W 4/021; H04W 4/023; H04W 28/16; H04W 4/027; H04W 64/003; H04W 84/045; H04W 4/008; H04W 4/028; H04W 4/16; H04W 36/18; H04W 40/12; H04W 4/025; H04W 4/08; H04W 4/02; H04W 8/18; H04W 36/0083; H04L 67/22; H04L 12/1859; H04L 51/38; H04L 67/04; H04L 67/18; H04L 67/20; H04L 67/26;
(Continued)

(56) References Cited

U.S. PATENT DOCUMENTS

| 9,544,323 B2 | 1/2017 | Porcello et al. |
| 2004/0263388 A1* | 12/2004 | Krumm ................ G01C 21/206 342/451 |

(Continued)

OTHER PUBLICATIONS

Beresford, Alastair R., Location Privacy in Ubiquitous Computing, University of Cambridge, 139 pages, No. 612. 2005.
(Continued)

*Primary Examiner* — Nimesh Patel
(74) *Attorney, Agent, or Firm* — Kurt Rauschenbach; Rauschenbach Patent Law Group, LLP

(57) ABSTRACT

A method of direction-aware device location includes establishing a region of interest comprising a plurality of wireless devices. A reference frame is then determined based on the established region of interest. A plurality of initial positions of the plurality of wireless devices is determined. A plurality of wireless signal strengths is measured as a function of time at each of the plurality of wireless devices. A topology of the plurality of wireless devices is determined as a function of time based on the plurality of measured wireless signal strengths as a function of time and the reference frame for each of the plurality of devices. Location and movement information is then determined as a function of time for each of the plurality of wireless devices based on the determined topology as a function of time.

28 Claims, 6 Drawing Sheets

(51) Int. Cl.
  *G01S 19/13* (2010.01)
  *G01S 5/02* (2010.01)
  *H04W 84/12* (2009.01)
  *H04W 84/04* (2009.01)
(52) U.S. Cl.
  CPC ........ *H04W 40/246* (2013.01); *H04W 84/042* (2013.01); *H04W 84/12* (2013.01)
(58) Field of Classification Search
  CPC ..... H04L 12/189; H04L 67/322; H04L 69/08; H04L 41/142
  See application file for complete search history.

(56) References Cited

U.S. PATENT DOCUMENTS

2013/0196685 A1* 8/2013 Griff .................. H04L 43/067
                                                          455/456.1
2017/0086084 A1* 3/2017 Jarvis .................. H04W 24/06

OTHER PUBLICATIONS

Bao, Jie, et al., Location-based and Preference-Aware Recommendation Using Sparse Geo-Social Networking Data, ACM SIGSPATIAL GIS, '12, Nov. 6-9, 2012, 10 pages, Redondo Beach, California.
https://developer.apple.com/library/content/documentation/ Use . . . , 4 pages, 2016; Retrieved Jul. 25, 2017.
U.S. Appl. No. 15/265,368, filed Sep. 14, 2016, USPTO, U.S.
U.S. Appl. No. 15/285,733, filed Oct. 5, 2016, USPTO, U.S.
U.S. Appl. No. 15/618,716, filed Jun. 9, 2017, USPTO, U.S.

* cited by examiner

700

$$M_{Geo} = \begin{bmatrix} X & Y & Z \\ dX/dt & dY/dt & dZ/dt \\ d^2X/dt^2 & d^2Y/dt^2 & d^2Z/dt^2 \end{bmatrix}$$

FIG. 7

METHOD AND APPARATUS FOR DIRECTION-AWARE DEVICE LOCATION

The section headings used herein are for organizational purposes only and should not be construed as limiting the subject matter described in the present application in any way.

INTRODUCTION

The growing number of wireless and wired network devices worldwide has generated a need for methods and apparatus that provide precise location and movement information about these devices quickly and efficiently. For example, indoor location-aware services play an increasingly central role in our individual and collective experiences, spanning beyond purely technological usage to a wide spectrum of what has now become essential modalities of interaction between heterogeneous entities: individuals, collectives, communities, and the world at large. Some key examples are social networking, augmented reality, law enforcement, health care, automated transportations, marketing, entertainment, asset tracking and many other applications. With the advent of a Fourth Industrial Revolution, and a world predicted to be networked by nearly 30 billion connected devices by 2025, accurate location identification of these devices—from smartphones to wearable devices to health monitors is a vital prerequisite for optimal quality in these above-mentioned services.

Location services are crucial to systems that need to derive insight from data that relates to location and movement. This includes location identification not only in terms of the current geographical coordinates but, also in terms of velocity and acceleration vectors. That is, speed, acceleration, and direction of any movement of the device. Movement generally includes absolute, relative motion, and rates of change of motions of devices. For example, 2×2 matrix elements for a Geolocation Tensor can be computed with respect to an inertial reference frame. The term "Geolocation" as used herein is the identification or estimation of the real-world geographic location of an object which can be, for example, the generation of a set of geographic coordinates.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 7 illustrates an embodiment of a location, movement, and acceleration matrix for providing direction-aware device location services of the present teaching.

DESCRIPTION OF VARIOUS EMBODIMENTS

Figure 1:
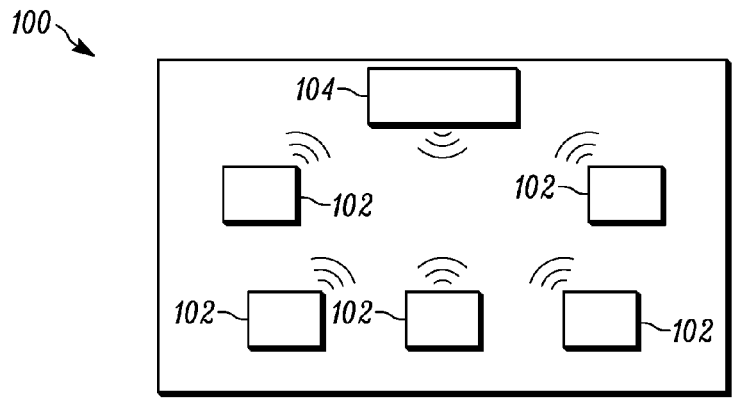
FIG. 1 illustrates a wireless network instantiation of an embodiment of an apparatus and method for providing direction-aware device location services according to the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Known systems that provide location information, such as global positioning system (GPS)-based devices or WiFi positioning systems, generally calculate device coordinates at the device and then store these coordinates as data in memory. Data is pushed at specific intervals to a central computer. These devices operate individually, and do not share location information. Also, the system uses shared information to help generate a moving map of one or more devices across a region.

Also, known GPS and other satellite based systems, as well as WiFi-based positioning systems, have adequate performance for large-scale patterned usage analysis perspective. However, emerging services, such as augmented reality, health monitoring and numerous other services are demanding higher precision, indoor location coordinates and movement awareness that are not provided by prior art GPS and WiFi positioning systems. These prior art location mechanisms for mobile devices fall short with respect to precision of the location coordinates as well as with respect to formally accommodating and accurately tracking changes in the coordinates with time. Satellite-based systems are designed for outdoor applications. WiFi-based systems are more accurate compared with satellite-based systems, especially for indoor locations because of the multipath effects where radio signals bounce off the surroundings and also because of significant signal loss suffered by the satellite signals.

In addition, known WiFi positioning systems generally use some combination of received signal strength indication, device fingerprinting, angle-of-arrival and/or time-of-flight data to determine location. All of these mechanisms use some form of measurement of signal strength and/or angle of arrival on the WiFi access points, in combination with the WiFi hotspot database. One seeding mechanism used to populate WiFi hot spot databases correlates mobile device GPS coordinates with known WiFi access point MAC addresses. Known WiFi methods and apparatus suffer from the same problems of approximation, static data, and lack of representation of movement and direction.

There is a significant need to improve the automation, efficiency and precision of device location and motion determination. Improved automated precise location and motion information will simplify and increase the efficiency of network operations and task management of a collection of wireless devices. Furthermore, automated precise location and motion information can improve the number, variety and quality of location-based services including, for example, detecting potential security events in real time like a malicious device in a closely monitored network.

One feature of the direction-aware device location service of the present teaching is that it incorporates device-to-device peer awareness across a set of networked devices to build a time-varying tensor field of device positions and velocities. By peer awareness, we mean that at least some of the peer devices emit a wireless signal with a known and unique identification. This allows other peer devices to measure a received signal strength of that wireless signal, and to use that measured signal strength to determine a distance to the emitting peer device. In this way, peer devices obtain awareness of their position relative to other peer devices, including scalar distance and scalar distance as a function of time. This allows a processor, which may be a server connected to the devices, to generate information on device location and movement, including velocity, acceleration and direction, of all the individual devices in the network. The peer awareness allows the system to achieve more precise location information than known WiFi positioning methods and apparatus. The direction-aware device location service of the present teaching represents the static location coordinates, velocity vector, and acceleration vector of a device in an integrated manner with high degree of accuracy.

Some embodiments of the method and apparatus for direction-aware device location according to the present teaching offer a precise geolocation service for managed network devices. Apparatus and methods that provide the service of the present teaching not only return the current location coordinates of networked devices extremely accurately but also track the movement of the networked devices, both with respect to the scalar speed as well as the direction of movement.

The determined location and movement information generated by various embodiments of the present teaching may remain and be utilized within the device, and/or be sent to a remote database that may act as a network management system and/or be provided to a cloud-based service or application that uses the information. The terms "cloud", and "cloud networking" as used herein includes services and networks that run over the public internet and work over any physical communications infrastructure, including wired or wireless infrastructures that may be privately or publicly owned, used and operated. The term "cloud" as used herein also includes so-called "private clouds" networking and services that run similarly over a private or proprietary infrastructure.

In some methods and apparatus according to the present teaching, a plurality of devices is deployed across a distributed network. The devices discover each other via known methods and set up location manager. The location manager may be a central server or a load-balanced hosted solution. In various embodiments, the location manager is a hardware device or processor, or the location manager is a software process that runs on hardware. The hardware may comprise a computer or CPU, integrated circuit, laptop, tablet or smartphone. The hardware may be a stand-alone device, multiple stand-alone devices, or be multiple devices operating in a cloud. The cloud may be a public cloud, a private cloud or a hybrid of public and private clouds.

FIG. 1 illustrates an embodiment of a network of devices of a direction aware device location system 100 of the present teaching. The devices 102 each comprise wireless network communication capability, such as WiFi, Bluetooth, cellular or LTE capability. The devices 102 connect to each other using wireless communication connections. A location manager 104 also has wireless communication capability, and the devices 102 connect to the location manager 104 using wireless communication connections. The location manager 104 processes algorithms and in some methods provides Representational State Transfer (REST)-based APIs for Geolocation Tensor values. In some embodiments, the location manager 104 is a standalone hardware element.

The devices 102 are one or more devices for which location and movement information is desired. The devices 102 may take the form of tablets, laptops, cell phones, smart phones and other specialized computing devices, such as gaming devices. The devices 102 may also take the form of video servers and security appliances. The devices 102 may include any of a variety of networked devices including network nodes, such as switches and routers, wireless routers, computer processors, and storage devices. The devices 102 can be client devices or server devices known in the art. For example, the devices can be wearable devices or any kind of Internet of Things (IoT) device that connects to the Internet, such as home appliances, Bluetooth devices, etc. In some embodiments, the location manager 104 is a wireless router or a wireless hotspot device. In some embodiments, the location manager 104 is a computer, such as a server or a laptop. In some embodiments, the location manager 104 is a cloud-based processor. In some embodiments, the location manager 104 is one or more of the devices 102.

Starting with a floor plan that can be a two or three-dimensional floor plan of the environment in which the devices 102 are located, the location manager 104 determines a Cartesian coordinate system that is overlaid on the floor plan of the environment. This Cartesian coordinate system may also be referred to as a frame of reference. For purposes of this disclosure, a "floor plan of an environment" is a one-, two- or three-dimensional spatial topology that represents a boundary of a space in which devices of interest are located. This boundary of space is referred to as a region of interest. One skilled in the art will appreciate that the space may be any size, such a small region like a room or a building, or a larger region like city or an even wider area. In various embodiments, the region of interest may comprise a one-dimensional, two-dimensional or three-dimensional geometry.

Multiple devices of interest are located within the floor plan of the environment and an initial location for each device is established with respect to the frame of reference. At this point, once an initial location of the devices of interest is established with respect to the frame of reference, the frame of reference may be adapted. For example, if the devices are moving substantially uniformly, the frame of reference may be adapted to be an inertial moving frame of reference. This may be the case if the devices of interest are located on a moving palate, or a vehicle of some sort, or for many other reasons. The frame of reference is chosen to reduce the complexity and computation required to determine the location of the devices of interest as a function of time by the direction-aware location method of the present teaching. In some methods according to the present teaching, a basis of motion of a frame of reference is matched to a basis motion of the collection of devices of interest to reduce the computation needed to establish device location as a function of time.

Figure 2:
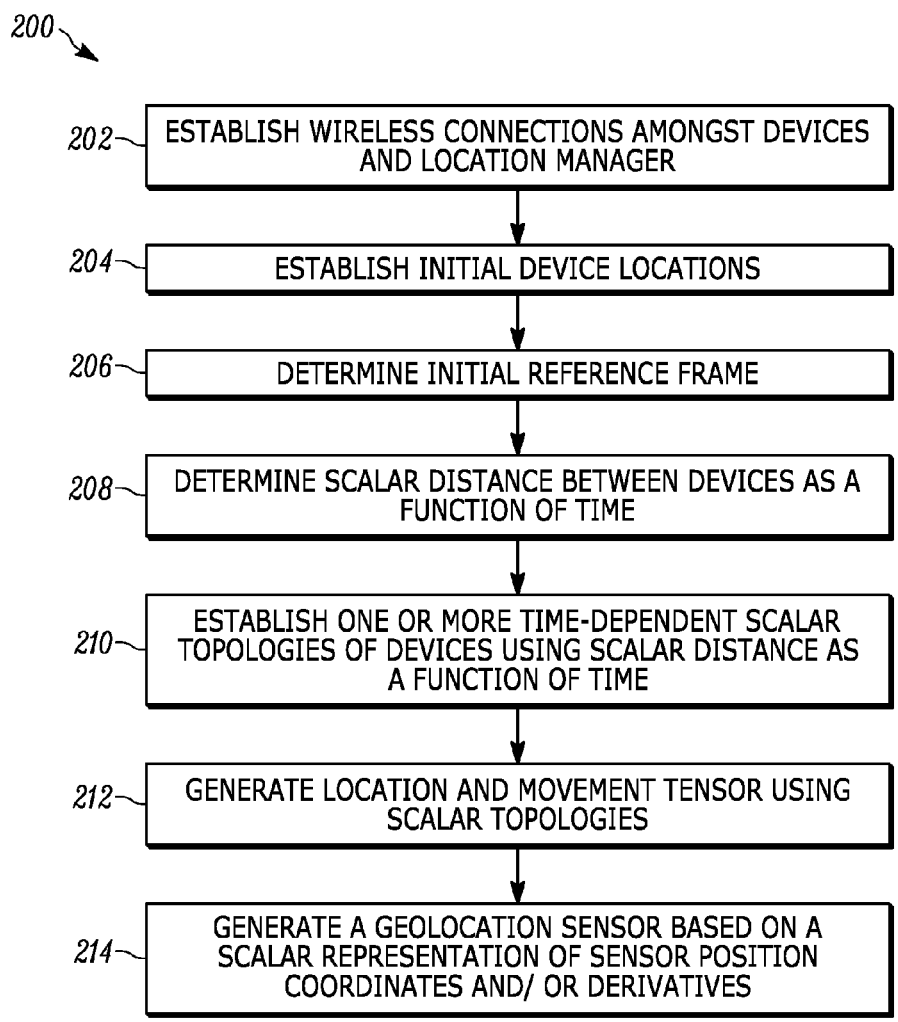
FIG. 2 illustrates a process flow diagram of an embodiment of an apparatus and method for providing direction-aware device location services of the present teaching.

FIG. 2 illustrates a process flow diagram 200 of an embodiment of a method for providing direction-aware device location services of the present teaching. In step one 202 of the method, each of a plurality of devices is in a space established wireless connection relative to each of the other devices and relative to a location manager. The space may be a space of any size, such a small region like a room or building, or a larger region like a city or a country.

In some embodiments, the location manager is one of the devices. In some embodiments, the location manager is not located in the space. In some embodiments, at least some of the connections between the devices and the location manager include a wired connection.

In step two 204 of the method, initial locations of each device are determined. The initial locations may be determined by any of a variety of known location determination mechanisms. For example, in one embodiment, the initial location is determined by GPS. In some embodiments, the initial location is determined by measuring the signal strengths of wireless signals emanating from each device.

In step three 206 of the method, an initial reference frame is determined. One aspect of the present teaching is the determination of improved or optimal reference frames for a given cluster of devices. In some embodiments, the initial reference frame is a grid across a floor plan of an environment in which the devices are located. For example, the initial reference frame may be a static three-dimensional Cartesian representation of a room in which the devices are located. The initial reference frame may be an appropriate density of latitude, longitude and altitude of a region in which the devices are located. The initial reference frame may be a static frame, or may be a moving inertial reference frame. In some embodiments, the determined locations are compared to a pre-defined frame of reference, and a processing step is used to determine whether the frame of reference should be adapted to accommodate the expected location and movement of the devices of interest. This adapting of the frame of reference provides reduced complexity and processing in other steps of the method that establish and maintain the time-dependent location and movement information about the devices of interest. In some embodiments, the frame of reference is adapted over time, based on the determined location and movement tensors of the devices.

In step four 208 of the method, a set of scalar distances between the devices is determined. In some embodiments, the scalar distance is determined as a function of time. In some embodiments, the scalar distance is determined based on a signal strength of a wireless signal. The wireless signal may emanate from another device, or the wireless signal may emanate from some other wireless transmitter that otherwise is not a device of interest. For example, the wireless transmitter may be a wireless modem, cell tower, or wireless hotspot. In some embodiments, each device determines a scalar distance to each of the other devices using the strength of wireless signal emanating from the other devices and stores these distances as an array. In some embodiments, each device determines a scalar distance to one or more reference sensors that emit a wireless signal, wherein the scalar distance is determined by a relative strength of the wireless signal emitted by the reference sensors. The scalar distances between devices are then derived from the determined distances to the reference sensors.

In step five 210 of the method, one or more time-dependent scalar topologies of the device positions are determined. The time-dependent scalar topologies may be derived at a location manager, based on information received by the devices, or at one or more of the devices, based on information shared from the other devices. The topologies may be represented as a sparse matrix of scalar distances between each pair of devices. Thus, one or more topologies are generated. In general, a time-dependent scalar topology may be generated from the perspective of each device of interest.

In step six 212 of the method, location and movement of the devices is determined based on the time-dependent scalar topologies. In some embodiments, a location coordinate, velocity vector and acceleration vector for each device is determined and maintained as a function of time for each device of interest in the space by the location manager by using multiple time-dependent scalar topologies. The data comprising location coordinates, velocity vector and acceleration vector for each device may be compiled and stored as a tensor that is referred to as the location and movement tensor. The data represents the location and movement of each of the devices of interest.

In step seven 214 of the method, a geolocation tensor is generated based on a scalar representation of sensor location coordinates and/or derivatives of location coordinates as a function of time. In various embodiments, various scales and/or coordinates are used in the tensor representation, as suited to the frame of reference. For example, latitude, longitude and/or altitude may be used, or various other length, speed and acceleration scales and coordinates may be used.

Figure 3:
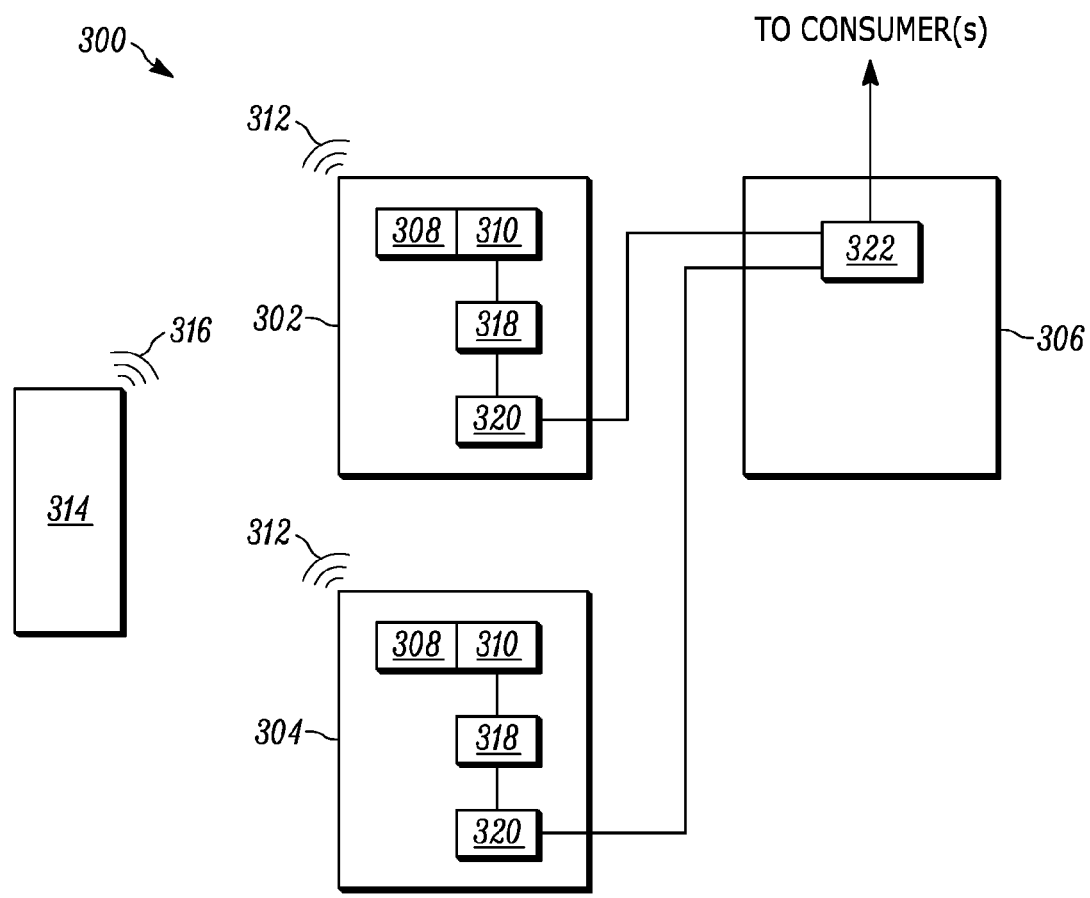
FIG. 3 illustrates an embodiment of a direction recognition and location system of the present teaching comprising direction recognition modules and a location service module.

FIG. 3 illustrates an embodiment of a direction recognition and location system 300 of the present teaching comprising direction recognition systems or modules 302, 304 and a location service module 306 of the present teaching. Two direction recognition modules 302, 304 are shown in FIG. 3, but the number of recognition modules 302, 304 can be any number. The location service module 306 is shown as a separate element in FIG. 3, but in various embodiments, the elements of the location service module 306 can be collocated with one or more direction recognition modules 302, 304 in the same wireless device. The location service module 306 may also be located remotely from the direction recognition modules 302, 304. The functions of the location service module 306 may also be implemented in a distributed processor architecture as well understood by those skilled in the art.

The direction recognition systems or modules 302, 304 include a wireless transmitter 308 and a wireless receiver 310. In some embodiments, the wireless transmitter 308 in each direction recognition module 302, 304 provides a wireless signal 312 with a predetermined and unique fingerprint that allows the wireless signal emitted by that device to be distinguished at wireless receiver in a different device. The wireless receiver 310 in each direction recognition module 302, 304 receives distinguishable wireless signals from a plurality of wireless devices. The wireless signals from each wireless device may each comprise a unique fingerprint for rapid identification of the emitting device and its last known position. The wireless signals may include cellular signals, LTE signals, WiFi signals, Bluetooth or any of a large variety of wireless signals. In various embodiments, the wireless devices may include direction recognition modules, or the wireless devices may be wireless transmitting devices 314 with known positions that transmit a wireless signal 316 that can be identified by the wireless receiver 310 in the direction recognition modules 302, 304. For example, the wireless transmitting device 314 may be a cell tower, a WiFi hot spot, or WiFi router that may not include a direction recognition module. Any number of wireless transmission devices 314 may be part of the direction recognition and location service system 300.

The direction recognition modules 302, 304 also include a power monitor 318 that measures a wireless signal strength of each identified wireless signal as a function of time. In this way, the power monitor 318 determines a wireless signal strength for each of the plurality of wireless devices in the region of interest. The power monitor 318 is connected to a positioning system 320 that determines relative positions of the plurality of wireless devices from the measured wireless signal strength of the plurality of wireless devices as a function of time. For example, the positioning system 320 in a particular device recognition module 302, 304 may determine a scalar distance to each of the other wireless devices based on the measured wireless signal strengths.

The power monitors 318 and positioning systems 320 are connected to a processor 322. In various embodiments, the connections from the power monitors 318 and positioning systems 320 to the processor 322 may be wireless communication links, or they may be wired communication links. In some embodiments the processor 322 is co-located in one or more device recognition module 302, 304. In the embodiment of FIG. 3, the processor 322 is located in a separate location service module 306. The processor 322 determines a topology of the plurality of wireless devices as a function of time from the plurality of measured wireless signal strengths as a function of time and determines location and movement information as a function of time for each of the plurality of wireless devices based on the determined topology as a function of time. In some embodiments, the location service module 306 functions are implemented as a software as a service (SaaS) stack running in the cloud, and the direction recognition modules 302, 304 sends the data from the power monitor 318 and position system 320 that relates about to their location and movements over the Internet using wireless and/or wired connections. The location service module 306, which in some embodiments is a SaaS stack, is also queried by consumers of the location service so that the consumers can obtain precise, reliable information about location coordinates of the wireless devices, their movements, and their change of movements. The location service module 306 may also push the location and movement information about the wireless devices to consumers.

Figure 4:
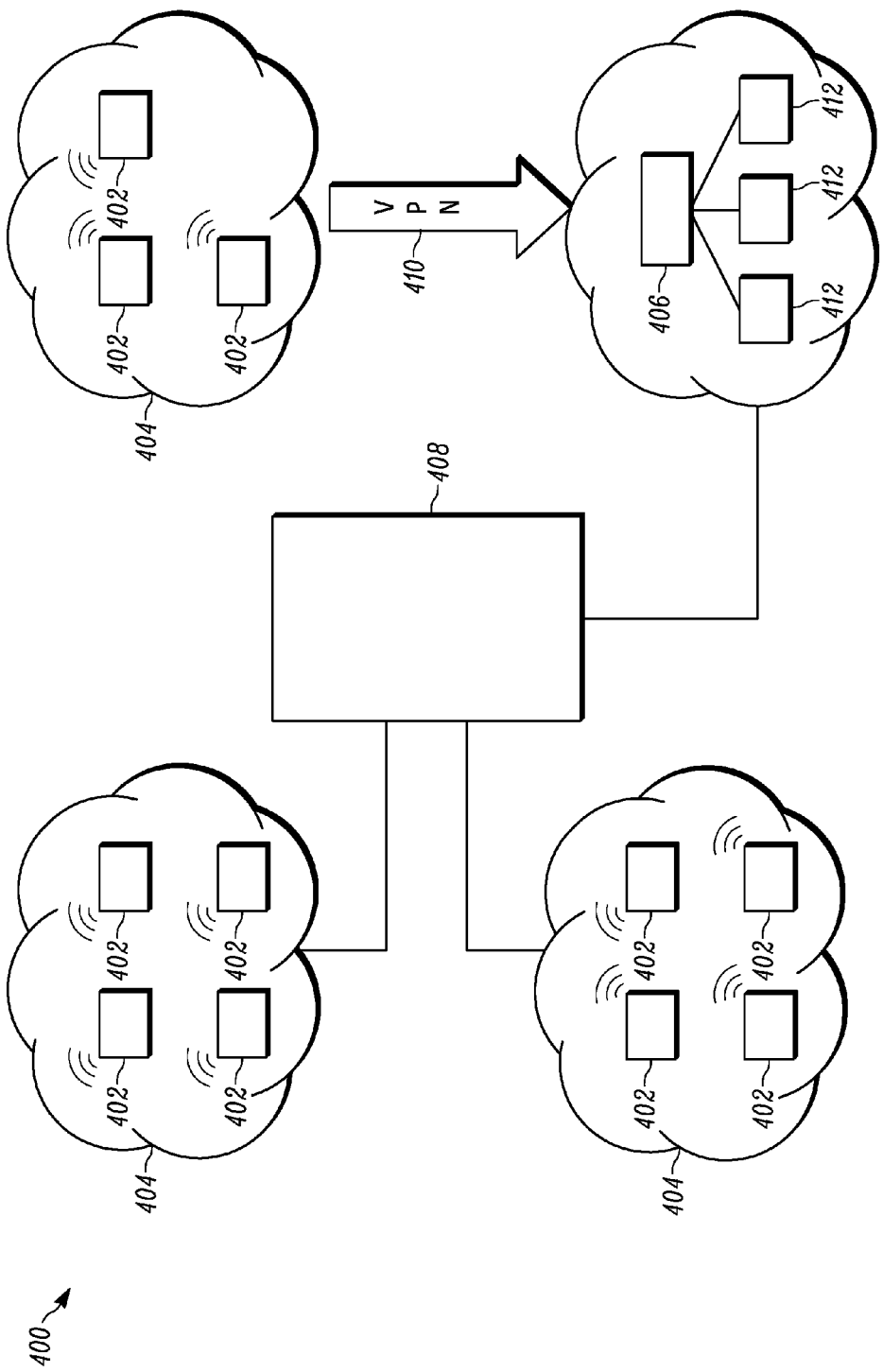
FIG. 4 illustrates a wireless and internet network instantiation of an embodiment of an apparatus and method for providing direction-aware device location services of the present teaching.

FIG. 4 illustrates an embodiment of a direction-aware device location system 400 comprising a hybrid network of devices 402 of the present teaching. The devices 402 reside in one or more local networks 404 that are connected to a location manager 406 via the Internet 408. One of the local networks 404 may connect to the location manager 406 via a virtual private network connection 410. In this embodiment, the location manager 406 is located remotely from the devices 402, and may be located at a private enterprise, or in a web-hosting site. The web-hosting site may be a public or private web hosting site. The location manager 406 is connected to various processors 412 that provide location-based services. The location-based services may include a wide variety of known applications including tracking, monitoring and other data-processing services. The location-based services may be privately or publicly available, depending on the service.

While the network configuration shown in FIG. 4 illustrates that the location manager 406 is a single box, the location manager 406 can be implemented in a variety of known configurations. Referring to both FIGS. 3 and 4, the location manager 406 may include a location service module 306. In some embodiments, the processors that provide the location manager function may be multiple processors in either centralized or distributed locations. The location manager 406 may also be a software application running on a dedicated processor. The location manager 406 may be a service built using any of a known set of frameworks for constructing services or web application in the cloud. The location manager may be implemented as a SaaS stack running on a public or private cloud.

Referring to FIGS. 1 and 4, each device 102, 402 includes a direction recognition module. The direction recognition module listens for known fingerprinted signals from other peer devices 102, 402 that are connected via wireless connections. The direction recognition module in each device 102, 402 either self-generates or receives from a location manager 104, 406 initial location coordinates. These coordinates may be computed using a GPS and/or WiFi positioning system. In a cluster of n devices represented by $D_i$ (i=1 ... n), each $D_i$ receives a static location coordinate vector, $C_i(x,y,z)$ (i=1 ... n) with Ci.x, Ci.y and Ci.z defined with respect to a pre-defined static frame of reference. The method of the present teaching is generally agnostic to the specific type of static frame of reference: it could be geographical coordinates or it could be local-area optimized static coordinates. In one embodiment, the frame of reference is a three dimensional geographical latitude, longitude and altitude. In other embodiments the frame of reference is a local frame of reference, such as Cartesian x, y, z or polar coordinates, r, $\varphi$, $\theta$, of a room or other space. In some embodiments, the frame of reference is two-dimensional or one-dimensional.

One feature of the present teaching is that the reference frame is chosen to improve the efficiency of the computation required to determine and maintain the location and movement of the devices. For example, the frame of reference may be moving but inertial, that is a non-accelerating frame of reference. In certain conditions a mobile but inertial frame of reference is more efficient than a static frame of reference. For example, when a proximate topological cluster of direction-aware devices of interest all are moving in similar steady speed (i.e., non-accelerating) in the same direction, an inertial but non-static frame of reference with the same speed and direction will reduce the computation required to maintain the device coordinates and velocities.

In embodiments in which the devices 102, 402 in the space are distributed homogeneously across a large geographical region then standard geographical coordinates, latitude, longitude and altitude are used. If the devices 102, 402 are distributed isotropically over a large area then the standard geographical coordinates are used despite any potential heterogeneity in their distribution over that same area.

If the devices are grouped in a proximate topological cluster but have no discernible resultant velocity vector then a static frame of reference centered on that cluster may be used. The frame of reference is likely to be different from geographical coordinates in these cases. If the devices are grouped in a proximate topological cluster and have a more or less consistent resultant velocity vector, than a non-static but inertial frame of reference centered on that cluster but moving at the speed and direction of the resultant velocity is used.

The direction recognition module in each device 102, 402 receives wireless signals from all nearby devices 102, 402, and determines a relative distance of each of the other devices 102, 402 at a particular point of time, t. In some embodiments, the received signal strength at one device from each of the other device is used to determine the relative distance between the one device and each of the other devices.

In this way, the direction recognition module in each device 102, 402 generates a topology of the relative position of the other devices as a function of time, t. The maximum radius of a cluster of n devices around a particular device, i, that may participate in the topology is determined by the maximum signal strength available from a device and the resulting maximum distance within which a device is detectable. The topology established in the direction recognition module for a device, Di, is a scalar distance, Sij, for each of the j other devices, representing the relative distance to all the other devices as a function of time. Each device has a particular device topology that is based on the device's particular perspective. These multiple device topologies are provided to the location manager 104, 406. The location manager 104, 406 generates a three-dimensional representation of the location and motion of each of the devices 102, 402 based on the initial positions and the time-dependent device topologies provided by the devices 102, 402.

At any given time, t, each Ci(Dj)—the topological representation of the device Dj in the peer cluster Ci as perceived by device Di—is represented by four numbers: Dj.x, Dj.y and D.z coordinates as originally received by Di from the central solution in the cloud, and the computed scalar distance Sij. In some embodiments, the scalar distance Sij is determined based on signal strength measured at the devices.

The location manager 104, 406 receives a series of such Ci(Dj) from the devices 102, 402 and it superimposes all such Dj.x, Dj.y and D.z coordinates and the Sij scalar distances to construct a set of tensor coordinates with respect to the frame of reference for each device Dk: Dk.x, Dk.y, Dk.z, Dk.d(x)/dt, Dk.d(y)/d(t), Dk.d(z)/d(t), $Dk.d^2(x)/dt^2$, $Dk.d^2(y)/dt^2$, $Dk.d^2(z)/dt^2$. This tensor represents the position, the velocity and the acceleration. This is a tensor of rank two, or a 3×3 matrix, and each device Di has an associated tensor variable Lij (i=1 . . . 3, j=1 . . . 3).

One feature of the present teaching is that it can be used to provide an API to build additional location and movement based services. In some embodiments, each device and associated tensor coordinates Di is also uniquely identifiable by its MAC address and/or some other UUID that is associated with the MAC address.

In some embodiments, the apparatus and methods of the present teaching supply an application programming interface (API) that provides, for a given uniquely identified device, the last computed tensor coordinates which yield accurate position, velocity and acceleration data about the device with respect to the static and/or moving inertial reference frame.

In some embodiments, the apparatus and methods of the present teaching supply an API that provides a prediction of the tensor coordinates (Di.x, Di.y, Di.z) of a uniquely identified device at any given time, $t_f$, in future. The accuracy of this prediction decreases exponentially as a function of future time, $t_f$.

In some embodiments, the apparatus and methods of the present teaching supply an API that provides for two given uniquely identified devices, Di and Dj a prediction their relative scalar distance Sij at given future time, $t_f$. The accuracy of this prediction decreases exponentially as a function of future time, $t_f$.

In some embodiments, the methods of the present teaching are implemented as a single cloud-based software as a service (SaaS) stack. In some embodiments the computational algorithm(s) of the present teaching can be decentralized across various computational nodes with higher degree of affinity with the devices. In some embodiments, some form of lambda-architecture, which is an architecture that includes both batch and stream processing, is used. In these embodiments, multiple processing elements receive the incoming Ci(Dj) data, each processing element receiving data from a different set of devices. These multiple processing elements process the data off the stream in parallel to some long-running batch processes that aggregate the processed data over a longer time period. In this way, the velocity vectors are generated more accurately and efficiently.

Figure 5:
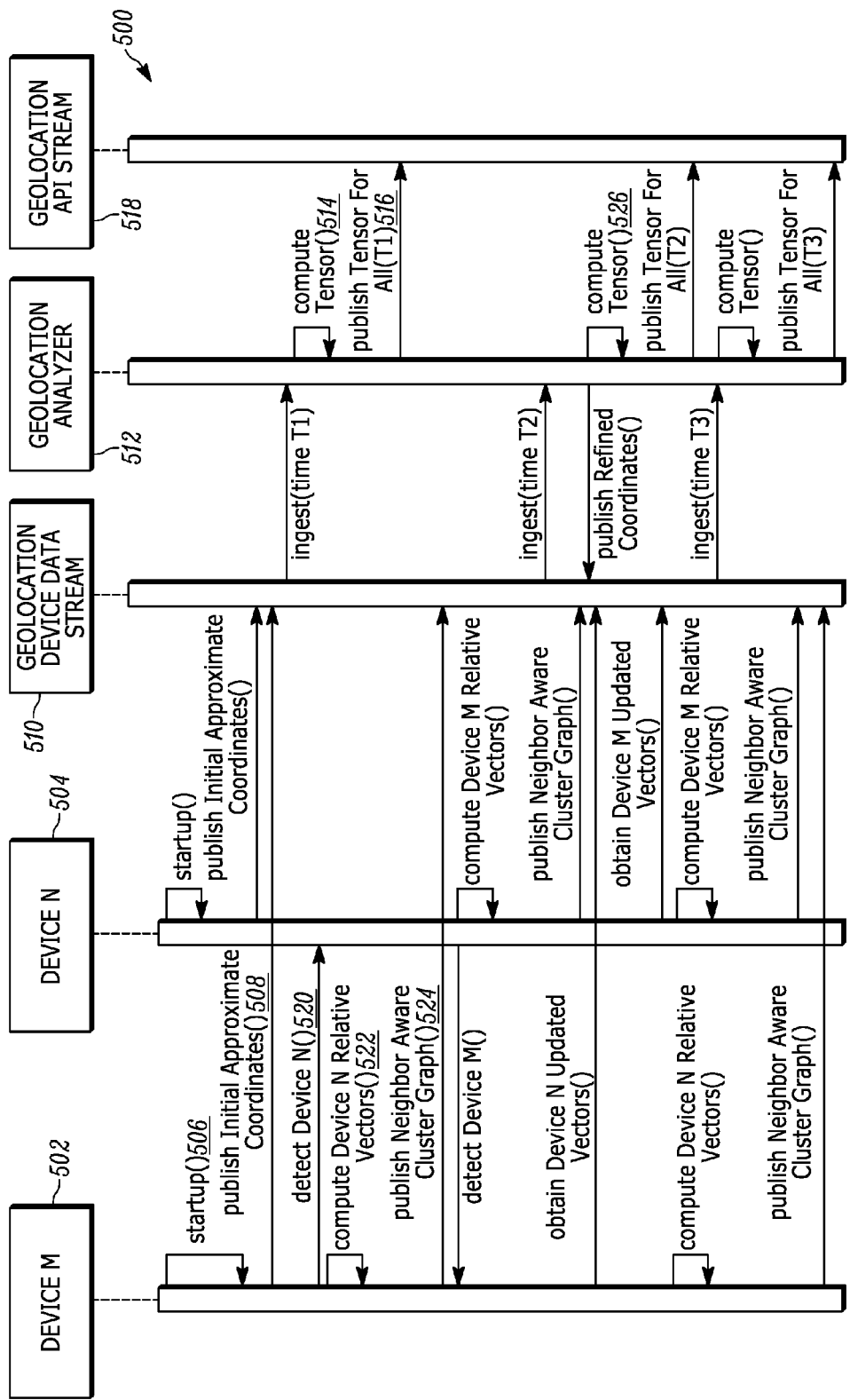
FIG. 5 illustrates a sequence diagram of an embodiment of an apparatus and method for providing direction-aware device location services of the present teaching.

FIG. 5 illustrates a sequence diagram 500 of an embodiment of an apparatus and method for providing direction-aware device location services of the present teaching. Device processes 502, 504 initiate a startup process 506 and publish 508 approximate location coordinates to a location manager geolocation device data stream process 510. FIG. 5 shows only two device processes 502, 504, but it is clear to those familiar with the art that other device processes may also be participating in the sequences illustrated by the sequence diagram 500. The participating devices are referred to as devices of interest, and their processes are not included the illustration of FIG. 5. The location coordinates at a time, T1, are analyzed using process 512 to determine a set of tensor coordinates 514 for each device. One feature of the present teaching is the scalability and speed of computation which is provided by the interaction between the geolocation device data stream process 510 and the geolocation analyzer process 512. The ingest mechanism of the geolocation analyzer process 512 reads data off live streams. The ingest mechanism is horizontally scalable to any necessary degree, which leads to near-real-time operation for updates from the geolocation device data stream process 510. This architecture provides both resilience and efficiency of the real-time computation of the tensor coordinates.

The tensor coordinates for each device are sent 516 to one or more API processes 518 to support various location-based services. The tensor coordinates are updated at a series of later times, T2, T3. The device processes 502, 504 also detect 520 other devices and determine 522 relative scalar distances to those devices. In some embodiments, the relative scalar distances are based on measured wireless signal strength.

One feature of the present teaching is the use of two different stream processes 510, 518. The device geolocation stream process 510 ingests the cluster graphs and sends data to the geolocation analyzer process 512, so that refined position and movement coordinates and their derivatives can be published in near real time. The geolocation API stream process 518 is able to provide compiled data to location service API's for consumers.

A topology is established by each device process, Di, is a scalar distance, Sij, for each of j other device processes (some not shown) in a space containing devices of interest. The topology represents the relative distance to all the devices of interest (some not shown) as a function of time. The device processes 502, 504 publish 524 these topologies and the location manager data stream process 510 uses these topologies to compute 526 updated location and movement tensors for all the devices of interest by process 512.

Those skilled in the art of software process and application implementation will appreciate that implementations of methods and apparatus of the present teaching are not limited to specific configurations presented here. In general, the processes and steps of the methods described may be implemented in various hardware platforms that may be associated with the devices or the location manager. Processes and steps of the method may be parallelized and distributed across processors and applications, consistent with the teaching herein, to realize speed and efficiency gains that are well understood in the art. The process and steps of the method are also implemented in various modules and devices based on the processing available within the device. For example, in the embodiment illustrated in FIG. 5, the wireless devices simply send a near-continuous stream of determined location coordinates of self and peer devices at very small time-intervals to a device data stream process. In this embodiment, the accurate velocity and acceleration vectors, or equivalently the second and third row in the geolocation tensor matrix, are computed in a SaaS solution side and not by the device. An advantage of this embodiment is the near-real time updating of the device data stream and the associated geolocation tensor matrix data stream and the inherent scalability in the number of devices providing neighbor-aware cluster graphs that can be accommodated.

Figure 6:
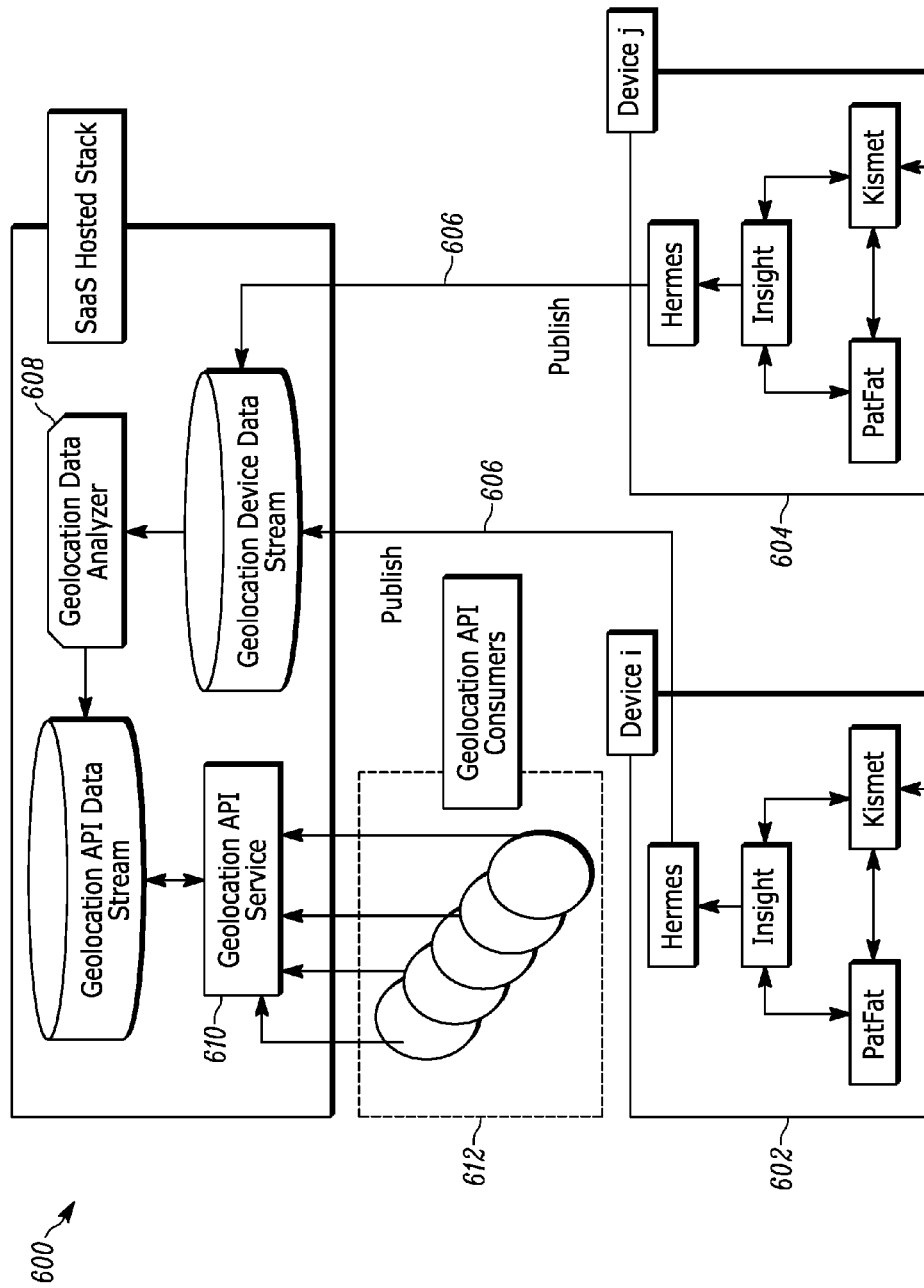
FIG. 6 illustrates an ecosystem of services of an embodiment of an apparatus and method for providing direction-aware device location services of the present teaching.

FIG. 6 illustrates an ecosystem of services 600 of an embodiment of an apparatus and method for providing direction-aware device location services of the present teaching. FIG. 6 illustrates how, in some embodiments, various application modules connect to perform various functions or services. FIG. 6 illustrates only two device processes 602, 604 for clarity. However, it is clear that more device processes may be participating in the direction-aware device location services method of the present teaching. The devices processes 602, 604 publish 606 initial location coordinates and matrices representing scalar distances to all the other devices of interest as a function of time. The published location and motion data is analyzed by a process 608 that determines a location and movement tensor for all the devices of interest. The location and movement tensor for all the devices of interest is used by an API process 610 to support a variety of location based services 612.

One feature of the direction-aware device location method of the present teaching is that the location and movement tensor may be used in a variety of APIs that use the tensor formalism. These APIs rely on the accurate capture of velocity and acceleration information about devices in addition to the position vector information about devices.

In some embodiments, the location and movement of a device at time, t, is generated as three 3-dimensional vectors: position, (X, Y, Z); velocity, (dX/dt, dY/dt, dZ/dt); and acceleration, $(d^2X/dt^2, d^2Y/dt^2, d^2Z/dt^2)$. These three vectors can be collectively represented as a rank-2 tensor, or in other words, a 3x3 matrix, $M_{Geo}$.

FIG. 7 illustrates the 3x3 location, movement, and acceleration matrix 700, $M_{Geo}$, for providing direction-aware device location services of the present teaching. The value of each $M_{ij}$ (i, j=0 . . . 2) in $M_{Geo}$ evolve with time. An application/service consuming the results of an embodiment of the direction-aware device location method of the present teaching can request a time-snapshot of the tensor in its entirety, or values of any combination of indices in the tensor.

An application/service consuming the results of an embodiment of the direction-aware device location system of the present teaching can utilize location and/or movement information for a single device and/or for multiple devices. An application/service consuming the results of an embodiment of the direction-aware device location system of the present teaching can utilize location and/or movement information to determine a relative distance and rate of change in that relative distance (relative velocity) between any two devices.

One embodiment of an API of the present teaching uses a representational state transfer-style (REST-style) formalism over HTTP(s) for uniform resource locator (URL) and commonly used JavaScript object notation (JSON) format for response body. The $ROOT identifies a common part of the URL pattern.

An API embodiment that gets full geolocation tensor coordinates calls: GET $ROOT/Devices/{deviceID}/Locations/. This will return a 3x3 numerical matrix. That is, value of $M_{Geo}$ at a given time, t. This response matrix can be encoded in a flat JSON structure where each key will be index-traversed horizontally. That is: {"00"="$M_{00}$.value", "01"="$M_{01}$.value", "02"="$M_{02}$.value", "10"="$M_{10}$.value", "11"="$M_{11}$.value", "12"="$M_{12}$.value", "20"="$M_{20}$.value", "21"="$M_{21}$.value", "22"="$M_{22}$.value"}.

An API embodiment that gets any combination of coordinate values calls: GET $ROOT/Devices/{deviceID}/Locations_indices=$M_{ij}$, $M_{kl}$, . . . , $M_{yz}$. The response JSON then will contain the scalar values for exactly those indices.

An API embodiment that gets the position values calls: GET $ROOT/Devices/{deviceID}/Locations_indices=$M_{00}$, $M_{01}$,$M_{02}$. This returns the position vector as the 1x3 array: {"00"="$M_{00}$.value", "01"="$M_{01}$.value", "02"="$M_{02}$.value"}.

An API embodiment that gets the velocity values calls: GET $ROOT/Devices/{deviceID}/Locations_indices=$M_{10}$, $M_{11}$,$M_{12}$. This will return the velocity vector as the 1x3 array {"10"="$M_{10}$.value", "11"="$M_{11}$.value", "12"="$M_{12}$.value"}.

An API embodiment that gets the acceleration scalar values calls: GET $ROOT/Devices/{deviceID}/Locations_indices=$M_{10}$,$M_{11}$,$M_{12}$. This will return the acceleration vector as the 1x3 array {"20"="$M_{20}$.value", "21"="$M_{21}$.value", "22"="$M_{22}$.value"}.

One feature of the direction-aware device location method of the present teaching is that it can be used to obtain any specific aspects of the coordinates and only those specific aspects. This allows for simple queries on the data represented by the location and movement tensor related to the particular motion or position of interest. Applications can react to this queried data, for example to inform an alarm condition or other request for information. For example, say an internet-of-things monitoring solution is established that continuously confirms that a series of assembly line devices are moving only in a two-dimensional plane and without any linear acceleration. For that purpose the monitoring solution will not need to know the location coordinates of the devices, neither will it care about the exact value of the velocity and acceleration. The solution receiving the stream of information from a location-based service of the present teaching will need to assert that there is no dZ/dt component at any point of time. That is, that the value of dZ/dt is zero. Further, $d^2X/dt^2$, $d^2Y/dt^2$, $d^2Z/dt^2$ are also equal to zero. Hence, that monitoring solution will simply need to assert that at all times $M_{12}=M_{20}=M_{21}=M_{22}=0$. This can be achieved if the API calls GET $ROOT/Devices/{deviceID}/Locations_indices=$M_{12}$, $M_{20}$, $M_{21}$, $M_{22}$. The API then ensures that this call always returns the following JSON{"12"="0", "20"="0", "21"="0", "22"="0"}. In some embodiments, an alarm is generated if the GET call returns non-zero data.

An API embodiment that gets the scalar distance between two devices at any given time, t, calls GET $ROOT/Devices/{deviceID1}/Distance/{deviceID2}. This will return a JSON with a single value, {"Distance"="value computed by the Location SaaS service"}.

An API embodiment that gets the velocity vector of Device 1 from the frame of reference of Device 2 calls GET $ROOT/Devices/{deviceID1}/Velocity/{deviceID2}. This will return a JSON containing values of a 1×3 matrix, computed from the frame of reference of the other device: {"10"="value computed by the Location SaaS service", "11"="value computed by the Location SaaS service", "12"="value computed by the Location SaaS service"}.

An API embodiment that gets all devices within the sphere, S, of radius, R, with known Device 1 in its center calls GET $ROOT/Devices/{deviceID1}/Neighbors/{R.value}. This will return an 1×N-dimensional array containing device ID for all N devices found within the spherical range of radius R from known device with id {deviceID1}. Specifically, {"device"="deviceID2", "device"="deviceID3", "device"="deviceIDi", . . . "device"="deviceIDN"}.

An API embodiment that gets an estimate of a device's location coordinates at a future time T1 based on the knowledge of the geolocation tensors of all the neighboring devices calls GET $ROOT/Devices/{deviceID}/FutureLocations_time=T1&indices=$M_{00},M_{01},M_{02}$. This call will return an estimated position vector (at time T1) values. Specifically returned is the position vector as the 1×3 array, {"00"="Estimated.$M_{00}$.value(T1)", "01"="Estimated.$M_{01}$.value(T1)", "02"="Estimated.$M_{02}$.value(T1)"}.

As will be clear to those familiar with the state of the art, the APIs are not limited to the specific examples provided above. The location and movement tensor determined by the method of the present teaching, as well as data provided in some of the outputs of the various steps of the method, may be queried and/or used in part or in whole by processes and services that require information about a device's, or a collection of devices', location and motion.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A method of direction-aware device location, the method comprising:
   a) establishing a region of interest comprising a plurality of wireless devices;
   b) determining a reference frame based on the established region of interest;
   c) determining a plurality of initial positions of the plurality of wireless devices;
   d) measuring a plurality of wireless signal strengths as a function of time at each of the plurality of wireless devices;
   e) determining a topology of the plurality of wireless devices as a function of time based on the plurality of measured wireless signal strengths as a function of time and the reference frame for each of the plurality of devices; and
   f) determining location and movement information as a function of time for each of the plurality of wireless devices based on the determined topology of the plurality of wireless devices as a function of time.

2. The method of direction-aware device location of claim 1 wherein the determining the topology of wireless devices as a function of time based on the plurality of measured wireless signal strengths as a function of time and the reference frame for each of the plurality of devices comprises determining a plurality of scalar distances between the wireless devices as a function of time using the plurality of measured wireless signal strengths as a function of time.

3. The method of direction-aware device location of claim 1 wherein determining the reference frame based on the established region of interest comprises determining a static reference frame.

4. The method of direction-aware device location of claim 1 wherein determining the reference frame based on the established region of interest comprises determining an inertial reference frame.

5. The method of direction-aware device location of claim 1 wherein the reference frame comprises Cartesian coordinates.

6. The method of direction-aware device location of claim 1 wherein the reference frame comprises latitude and longitude coordinates.

7. The method of direction-aware device location of claim 1 wherein the region of interest comprises a one-dimensional geometry.

8. The method of direction-aware device location of claim 1 wherein the region of interest comprises a two-dimensional geometry.

9. The method of direction-aware device location of claim 1 wherein the region of interest comprises a three-dimensional geometry.

10. The method of direction-aware device location of claim 1 further comprising generating a geolocation tensor based on a scalar representation of location coordinates and one or more derivatives of location coordinates of the plurality of wireless devices.

11. The method of direction-aware device location of claim 1 further comprising adapting the reference frame based on a motion of the plurality of wireless devices.

12. The method of direction-aware device location of claim 11 wherein the adapting the reference frame further comprises adapting the reference frame based on the velocities of each of the plurality of wireless devices.

13. The method of direction-aware device location of claim 1 further comprising determining a velocity vector as a function of time for each of the plurality of wireless devices.

14. The method of direction-aware device location of claim 1 further comprising determining a relative distance and rate of change of relative distance between at least two of the plurality of wireless devices.

15. The method of direction-aware device location of claim 1 further comprising determining an acceleration vector as a function of time for each of the plurality of wireless devices.

16. The method of direction-aware device location of claim 1 further comprising determining a plane of motion for the plurality of wireless devices.

17. The method of direction-aware device location of claim 1 further comprising storing location coordinates, a velocity vector, and an acceleration vector of each of the plurality of wireless devices.

18. The method of direction-aware device location of claim 1 wherein determining the reference frame based on the established region of interest comprises selecting a reference frame to improve efficiency of computations used to determine location and movement of the plurality of wireless devices.

19. The method of direction-aware device location of claim 1 wherein determining the reference frame based on the established region of interest comprises determining a mobile and inertial reference frame.

20. A direction recognition system comprising:
 a) a wireless receiver that receives known fingerprinted signals from a plurality of wireless devices;
 b) a power monitor that measures a wireless signal strength as a function of time for each of the plurality of wireless devices;
 c) a positioning system that determines relative positions as a function of time of the plurality of wireless devices from the measured wireless signal strength as a function of time for each of the plurality of wireless devices; and
 d) a processor having an input that is electrically connected to an output of the power monitor and having an input that is electrically connected to an output of the positioning system, the processor determining a topology of the plurality of wireless devices as a function of time from the plurality of measured wireless signal strengths as a function of time and determining location and movement information as a function of time for each of the plurality of wireless devices based on the determined topology as a function of time.

21. The direction recognition system of claim 20 wherein the processor comprises the positioning system.

22. The direction recognition system of claim 20 wherein the positioning system comprises a Global Positioning System (GPS).

23. The direction recognition system of claim 20 wherein the positioning system comprises a WiFi positioning system.

24. The direction recognition system of claim 20 wherein the wireless receiver comprises a WiFi receiver.

25. The direction recognition system of claim 20 wherein the wireless receiver comprises a cellular receiver.

26. The direction recognition system of claim 20 wherein the wireless receiver comprises a LTE receiver.

27. The direction recognition system of claim 20 wherein the wireless receiver communicates with a wireless location manager.

28. The direction recognition system of claim 20 wherein the location and movement information as a function of time for each of the plurality of wireless devices is represented as a rank-2 tensor comprising a location vector, a speed vector, and an acceleration vector.

* * * * *